(12) United States Patent
Schwarz

(10) Patent No.: US 11,060,966 B2
(45) Date of Patent: Jul. 13, 2021

(54) DOCKING STATION FOR A SURFACE MEASURING APPARATUS

(71) Applicant: BYK-GARDNER GMBH, Geretsried (DE)

(72) Inventor: Peter Schwarz, Königsdorf (DE)

(73) Assignee: BYK-GARDNER GMBH, Geretsried (DE)

( * ) Notice: Subject to any disclaimer, the term of this patent is extended or adjusted under 35 U.S.C. 154(b) by 0 days.

(21) Appl. No.: 16/626,444

(22) PCT Filed: Jun. 15, 2018

(86) PCT No.: PCT/EP2018/065921
§ 371 (c)(1),
(2) Date: Dec. 24, 2019

(87) PCT Pub. No.: WO2019/001987
PCT Pub. Date: Jan. 3, 2019

(65) Prior Publication Data
US 2020/0132593 A1    Apr. 30, 2020

(30) Foreign Application Priority Data
Jun. 29, 2017  (DE) .......................... 102017211067.8

(51) Int. Cl.
*G01N 21/25* (2006.01)
*G01B 11/25* (2006.01)
(Continued)

(52) U.S. Cl.
CPC ........... *G01N 21/255* (2013.01); *G01B 11/25* (2013.01); *G01N 21/274* (2013.01); *G01N 21/57* (2013.01); *G01N 2201/0221* (2013.01)

(58) Field of Classification Search
CPC .... G01N 21/274; G01N 21/57; G01N 21/255; G01N 21/55; G01N 2201/0221; G01B 11/25; G01J 3/0291; G01J 3/524
(Continued)

(56) References Cited

U.S. PATENT DOCUMENTS

2005/0242191 A1* 11/2005 Baker ................ G01N 21/8483
235/472.01
2005/0243316 A1* 11/2005 Cargill ...................... G01J 3/46
356/402

FOREIGN PATENT DOCUMENTS

CN          1963413        5/2007
CN         204128662       1/2015
(Continued)

OTHER PUBLICATIONS

International Search Report and Written Opinion for International (PCT) Patent Application No. PCT/EP2018/065921, dated Aug. 24, 2018, 15 pages.
(Continued)

*Primary Examiner* — Tri T Ton
(74) *Attorney, Agent, or Firm* — Sheridan Ross P.C.

(57) ABSTRACT

The invention relates to a docking station 2 for a surface measuring apparatus 1, more particularly an optical surface measuring apparatus. The docking station has a reference measuring surface 4 which can be brought into a covered state in which it is covered from the environment of the docking station 2 and an uncovered state in which it is not covered from the environment of the docking station 2. When the surface measuring apparatus 1 is in the docking station 2 and the reference measuring surface 4 is in the uncovered state, the surface measuring apparatus 1 can perform a reference measurement of the reference measuring surface 4 and can calibrate the surface measuring apparatus 1 using the reference measurement. In contrast, when
(Continued)

Figure 1:
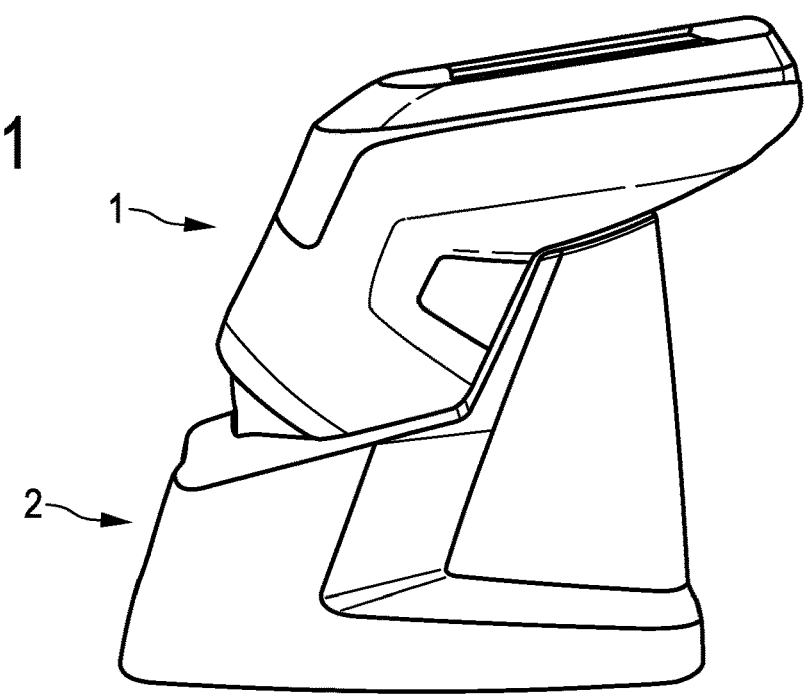

the reference measuring surface 4 is in the covered state, it is not exposed to the environment of the docking station 2 and is therefore protected from, for example, dust, light, moisture or mechanical impacts. The covered and uncovered states of the reference measuring surface 4 are preferably reached through a movement of the reference measuring surface 4 itself or through a movement of a cover for the reference measuring surface 4.

19 Claims, 2 Drawing Sheets

(51) Int. Cl.
*G01N 21/27* (2006.01)
*G01N 21/57* (2006.01)
(58) Field of Classification Search
USPC .................................................. 356/600–640
See application file for complete search history.

(56) References Cited

FOREIGN PATENT DOCUMENTS

| | | |
|---|---|---|
| DE | 3313668 | 10/1984 |
| DE | 112005000969 | 3/2007 |
| EP | 1178282 | 2/2002 |
| WO | WO 2010/021266 | 2/2010 |
| WO | WO 2016/063284 | 8/2016 |

OTHER PUBLICATIONS

English Translation of the International Search Report for International (PCT) Patent Application No. PT/EP2018/065921, dated Aug. 24, 2018, 2 pages.

Official Action with machine translation for China Patent Application No. 201880041355.1, dated May 6, 2021, 16 pages.

* cited by examiner

DOCKING STATION FOR A SURFACE MEASURING APPARATUS

CROSS REFERENCE TO RELATED APPLICATIONS

This application is a national stage application under 35 U.S.C. 371 and claims the benefit of PCT Application No. PCT/EP2018/065921 having an international filing date of 15 Jun. 2018, which designated the United States, which PCT application claimed the benefit of German Patent Application No. DE 10 2017 211 067.8 filed Jun. 29, 2017, the contents of each of which are incorporated herein by reference in their entireties.

The entire content of the DE 10 2017 211 067.8 priority application is hereby incorporated by reference into the present application.

The present invention relates to a docking station for a surface measuring apparatus.

The invention will be described in the following using the example of a surface measuring apparatus for determining optical surface properties. This does not, however, constitute any limitation thereof. The invention is just as applicable to other surface measuring apparatus, e.g. for determining mechanical, chemical or physical, albeit non-optical, surface properties.

Optical surface properties to be determined are, for example, the gloss, the color, the "haze," the sharpness, the "distinctness of image" (brilliancy or definition) or the "orange peel" (a measure of the rippling) of the surface. Such surface properties are measured and controlled during, inter alia, the quality control of optical surfaces such as finishings, for example of furniture or automobiles.

The optical surface measuring apparatus preferably comprises at least one light source, the light of which can be directed through an opening in the housing of the surface measuring apparatus onto a measurement surface; i.e. onto a portion of the surface to be measured, as well as at least one detector which receives the light reflected from the measurement surface. Preferentially, the light source is a light-emitting diode. Multiple light sources and/or multiple detectors, which are preferably respectively arranged at different angles to the measurement surface, can also be provided. The surface measuring apparatus is preferably set onto the measurement surface for the measurement.

The respective optical property can then be determined by evaluating the light received by the detector, including the light emitted by the light source. The surface measuring apparatus comprises a corresponding control and evaluation unit for effecting and evaluating the measurement.

Surface measuring apparatus of the type considered need to be calibrated during start-up as well as at specific intervals in order to ensure high measuring accuracy. The calibration appropriately ensues by measuring a so-called reference measuring surface which represents a test standard of precisely defined surface properties, for example a precisely defined color. Verified test standards in compliance with the relevant international standards are for instance provided by Germany's Federal Institute for Materials Research and Testing [Bundesanstalt für Materialforschung und-prüfung (BAM)] or the National Metrology Institute of Germany [Physikalisch-Technischen Bundesanstalt (PTB)] as so-called master standards or as so-called transfer standards calibrated on the basis of master standards. The potentially repeated derivation using transfer standards ultimately provides the user of a surface measuring apparatus with a so-called working standard which can thus be traced back to the corresponding international standard. This working standard can then be used over the operating life of the surface measuring apparatus to calibrate same by performing reference measurements of the reference measuring surface pertaining to said working standard.

Surface measuring apparatus of the type considered are often delivered together with an associated receiving apparatus, also called a "docking station." The surface measuring apparatus can be set or placed into the docking station and establishes a connection to the docking station, preferably via electrical contacts or even wirelessly. The docking station is in turn preferably connected to the electrical grid and/or to a computer or a data network.

The docking station then provides certain functions, in particular charging a battery in the surface measuring apparatus, preferably via electrical contacts or inductively, detecting the operating state of the surface measuring apparatus, and/or transmitting data between the surface measuring apparatus and the docking station, preferably transmitting measurement data from the surface measuring apparatus to the docking station and/or transmitting control commands between the surface measuring apparatus and the docking station. The data transmission preferably likewise ensues via electrical contacts, in particular by means of a USB connection, and further preferentially wirelessly via WLAN.

Further known is the integrating of a test standard with a reference measuring surface into such a docking station. As soon as the surface measuring apparatus is inserted into the docking station, it automatically assumes a position in which the reference measuring surface lies in front of the measuring opening of the surface measuring apparatus so that a reference measurement of the reference measuring surface can be taken in this position. The surface measuring apparatus can thereupon be calibrated using the reference measurement.

The problem thereby arises, particularly when the surface measuring apparatus is in use and thus not accommodated in the docking station, of the reference measuring surface of the test standard being exposed to the environment of the docking station, e.g. dust, light, moisture or mechanical impacts, during the handling or transport of the docking station. This can lead to an undesirable change in the reference measuring surface, for example due to a layer of dust, or fading, hazing or scratches, which in turn distorts the reference measurements with the test standard.

The present invention is therefore based on the task of further improving a docking station having a reference measuring surface for an in particular optical surface measuring apparatus as well as a method for calibrating such a surface measuring apparatus using a reference measuring surface.

This task is solved by a docking station in accordance with claim 1 and a calibration method in accordance with claim 17. Advantageous further developments of the invention are set forth in the subclaims.

As described above, the invention is based on a docking station for an in particular optical surface measuring apparatus having at least one reference measuring surface which is preferably part of a test standard. According to the invention, the reference measuring surface can be brought into at least one covered state in which it is covered from the environment of the docking station and at least one uncovered state in which it is not covered from the environment of the docking station.

Thus, in the covered state, the reference measuring surface is not exposed to the environment of the docking station and is therefore better protected. Conversely, when the surface measuring apparatus is accommodated in the docking station and the at least one reference measuring surface is in the at least one uncovered state, a reference measurement can be made of the at least one reference measuring surface.

In one particularly preferential embodiment of the invention, the at least one reference measuring surface can be moved relative to the docking station into at least one covered position in which it is covered from the environment of the docking station, particularly by a housing of the docking station. The at least one reference measuring surface can thereby be brought into a covered state. In addition, the at least one reference measuring surface can be moved relative to the docking station into at least one uncovered position, which differs from the at least one covered position, in which it is not covered from the environment of the docking station. The at least one reference measuring surface can thereby be brought into an uncovered state.

The covered state and the uncovered state are thus effected by a movement of the reference measuring surface itself. In the covered state, the reference measuring surface is thus situated inside the housing of the docking station and covered by same. In the uncovered state, the reference measuring surface is preferably no longer covered by the housing of the docking station but rather emerges from the housing or is at least positioned at an opening or gap of the housing and is accessible, in particular visible, through same from the outside. When accommodated in the docking station, the surface measuring apparatus is preferably positioned such that its measuring opening comes to lie over the reference measuring surface, thereby enabling the reference measurement.

In a further preferential variant of this implementation, the docking station further comprises at least one closure which is movable relative to the docking station into at least one closed position, in which it closes an opening in the docking station housing, and at least one open position, in which it does not close said opening, whereby the closed position of the at least one closure corresponds to the uncovered position of the at least one reference measuring surface. In so doing, the closure can close the opening in the housing of the docking station in the covered position of the reference measuring surface so that the reference measuring surface is fully protected against environmental influences such as light, dust, etc. in the covered position.

In each case, the movement of the at least one reference measuring surface and the movement of the at least one closure is thereby preferably a pivoting motion, and the two pivoting movements are preferably mechanically coupled, in particular by a lever mechanism.

Particularly a "phase-shifted" coupling of the two pivoting movements thereby allows the closure to be in its closed position while the reference measuring surface is in its covered position and the closure to not be in its closed position while the reference measuring surface is in its uncovered position in a structurally simple manner. This thereby prevents the closure from colliding with the reference measuring surface in the closed position of the closure, which corresponds to the uncovered position of the reference measuring surface.

Preferably an electric motor, more preferably a stepper motor, is used as the common drive for the two coupled pivoting movements.

In a further preferential variant of this implementation, the docking station has a plurality of reference measuring surfaces, in particular two, three, four, five, six or more. Each reference measuring surface can then be moved into an uncovered position so that reference measurements with different reference measuring surfaces and thus different test standards are possible. This thereby enables even further increasing the calibration accuracy of the surface measuring apparatus without increasing effort for its user since the multiple test standards necessary are all already provided in the docking station.

In one preferential variant of this implementation, the positions of the reference measuring surfaces relative to each other are not changeable. The reference measuring surfaces can in particular be arranged on a common rigid component and be moved together.

The number of possible positions of each reference measuring surface is thereby preferentially equal to the number of reference measuring surfaces, and of said possible positions, exactly one position is an uncovered position and the remaining positions are covered positions. The reference measuring surfaces thus swap positions in the joint movement, whereby only one reference measuring surface is ever in an uncovered position and each of the remaining reference measuring surfaces are in a covered position.

This can preferentially be realized by the movement of the reference measuring surfaces between their possible positions being a rotational movement about a common axis. As a specific technical implementation, particularly all the reference measuring surfaces can be arranged on a common revolving mechanism; i.e. the individual reference measuring surfaces are arranged along the circumference of a preferentially wheel, drum or disk-shaped element respectively able to rotate the angular distance of a reference measuring surface. This element is preferably arranged inside the housing of the docking station, thereby resulting in the covered positions. An opening in the housing of the docking station is preferably provided at one point along the circumference of the revolving mechanism, thereby resulting in the uncovered position.

Such a construction is particularly space-saving, which is in particular of advantage given the relatively small dimensions of a hand-held surface measuring apparatus and corresponding docking station.

In a further preferential implementation of the invention, the docking station comprises means, in particular magnetic means or latching means, for at least temporarily fixing the at least one reference measuring surface in the at least one uncovered position. This thereby enables ensuring the most exact possible positioning of the reference measuring surface in the uncovered position during the reference measurement.

In a further particularly preferential implementation of the invention, the at least one reference measuring surface in contrast to the implementation described above in which the reference measuring surfaces can be brought into covered and uncovered positions is not movable relative to the docking station. Instead, the docking station has at least one cover movable into a covered position in which it covers the at least one reference measuring surface from the environment of the docking station. The at least one reference measuring surface can thus be brought into a covered state. In addition, the cover can be moved into an uncovered position in which it does not cover the at least one reference measuring surface from the environment of the docking station. The at least one reference measuring surface can thus be brought into an uncovered state. Thus in this implementation, the reference measuring surface itself does not move so as to be brought into the uncovered state but instead the latter occurs due to a movement of the cover.

This implementation of the invention is particularly appropriate when only one reference measuring surface is provided in the docking station. In this case, it can be more space-saving as well as structurally simpler and thus more economical for the reference measuring surface itself not to move but rather only a cover of the reference measuring surface.

Particularly in this implementation of the invention, the movement of the at least one cover from the at least one covered position into the at least one uncovered position can be triggered by the surface measuring apparatus being introduced into the docking station and/or the movement of the at least one cover from the at least one uncovered position into the at least one covered position can be triggered by the surface measuring apparatus being removed out of the docking station.

In so doing, the reference measuring surface is then only in the (exposed) uncovered state when the surface measuring apparatus is accommodated in the docking station and it thus should be possible for a reference measurement to be performed. If, on the other hand, the surface measuring apparatus is not in the docking station, then the reference measuring surface is also not needed for a reference measurement and is thus in a covered state in the present implementation. Furthermore, the transition between the covered and uncovered state of the reference measuring surface is automated in simple manner in this implementation such that the user does not need to be concerned with the state of the reference measuring surface.

Preferably, the cover in this implementation of the invention is movable between the at least one uncovered position and the at least one covered position by a lever mechanism able to be actuated by the surface measuring apparatus.

Of course, also in the implementation initially described, in which the at least one reference measuring surface is movable into at least one covered position and at least one uncovered position, said movement from the at least one covered position into the at least one uncovered position can be triggered by the insertion of the surface measuring apparatus into the docking station and/or said movement from the at least one uncovered position into the at least one covered position can be triggered by the removal of the surface measuring apparatus from the docking station.

In the last described embodiment, which makes use of a movable cover, the cover in the covered position is preferably situated between the reference measuring surface and an opening in the housing of the docking station. Upon the surface measuring apparatus being inserted into the docking station, the measuring opening of the surface measuring apparatus preferably contacts the exterior of the housing. If the cover is then moved into the uncovered position, a distance then results between the reference measuring surface and the measuring opening which corresponds to the sum of the housing wall thickness and the thickness of the cover.

This distance can be problematic for the reference measurement when it is assumed during the reference measurement that the surface measuring apparatus with its measuring opening is set directly on the reference measuring surface.

A preferential modification of the cited embodiment therefore provides for the at least one reference measuring surface to still be slightly movable relative to the docking station in order to reduce the distance between the reference measuring surface and the measuring opening of the surface measuring apparatus when the surface measuring apparatus is inserted into the docking station. Preferably, said distance is thereby reduced to zero; i.e. the reference measuring surface makes direct contact with the measuring opening.

Preferably, this reduction in distance is achieved by a lifting device for the reference measuring surface. Should the cover, as described above, be movable between the at least one uncovered position and the at least one covered position by a lever mechanism, this lifting device is then preferably coupled to the lever mechanism. The coupling is preferably designed such that the lifting device is activated at the end of the movement of the cover, when it is already mostly in the uncovered position, and the reference measuring surface moved through the housing opening toward the measuring opening of the surface measuring apparatus.

The lifting device can thereby be realized entirely mechanically, preferably by a further lever mechanism, or also by an actuator, in particular by an electrical control element, preferably an electric motor or a piezo actuator.

In a further preferential implementation of the invention, the at least one reference measuring surface can be aligned into the at least one uncovered state for the performing of the reference measurement. As a result, the accuracy of the reference measurement can be further increased by exact alignment, in particular a particularly good parallelism of the reference measuring surface in relation to the surface measuring apparatus.

Such an alignment of the at least one reference measuring surface for performing the reference measurement can preferably be initiated upon contact with the surface measuring apparatus. In particular, an area around the measuring opening of the surface measuring apparatus can thereby be brought into contact with the reference measuring surface, whereby the reference measuring surface automatically aligns with the measuring opening.

To that end, the at least one reference measuring surface is preferably supported on an elastic element, in particular an elastomer element or a foam element. The elastic element then yields upon contact with the surface measuring apparatus and thus enables the alignment of the reference measuring surface relative to the surface measuring apparatus.

In a further preferential implementation of the invention, the docking station comprises means, in particular magnetic means or latching means, for at least temporarily fixing the surface measuring apparatus in the docking station. Similar to the means specified above for fixing the reference measuring surface, thereby able to be ensured is the most exact possible positioning of the surface measuring apparatus during the reference measurement and thus also the best possible reproducible arrangement of the reference measuring surface.

A calibration method for a surface measuring apparatus according to the invention comprises the following steps:
   a) introducing the surface measuring apparatus into a docking station according to the invention,
   b) bringing the at least one reference measuring surface into the at least one uncovered state,
   c) performing a reference measurement of the at least one reference measuring surface with the surface measuring apparatus and calibrating the surface measuring apparatus using the reference measurement,
   d) removing the surface measuring apparatus from the docking station,
   e) bringing the at least one reference measuring surface into the at least one covered state.

In the process, step b) can be performed before, during or after step a), and/or step e) before, during or after step d), whereby the steps are otherwise performed in the order indicated.

In one preferential implementation of the method, however, step b) is triggered by step a), and/or step e) by step d), i.e. the reference measuring surface is brought into the uncovered state by the surface measuring apparatus being introduced into the docking station or, respectively, the reference measuring surface is brought into the covered state by the surface measuring apparatus being removed from the docking station. This results in the advantages already described above with respect to the apparatus.

In a further preferential implementation of the method, the user of the surface measuring apparatus can also trigger step b) independently of step a), and/or step e) independently of step d); i.e. the change in reference measuring surface state is effected independently of the introduction/removal of the surface measuring apparatus into/out of the docking station, thus manually by the user.

This can in particular ensue via at least one control element on the docking station and/or on the surface measuring apparatus, preferably via a button or a switch operated by the user in order to bring the reference measuring surface from a covered state into an uncovered state or vice versa. This is a particularly simple structural solution and gives the user maximum control over the state of the reference measuring surface.

In particular, the user thereby also has the possibility of bringing the reference measuring surface into a covered state (step e) prior to removing the surface measuring apparatus from the docking station (step d). Thus able to be ensured assuming that the reference measuring surface is also sufficiently protected in the uncovered state by the surface measuring apparatus inserted into the docking station is that the reference measuring surface is at no point in time exposed to the environment of the surface measuring apparatus.

The control element can be affixed to the surface measuring apparatus or a control element already provided on the surface measuring apparatus can be used for this purpose. Preferably, however, the control element is affixed to the docking station so that a trigger signal for the reference measuring surface change of state does not need to be transmitted from the surface measuring apparatus to the docking station.

In the calibration method described thus far, a reference measurement and a calibration of the surface measuring apparatus (step c) is performed each time the surface measuring apparatus is brought into the docking station.

In a further preferential implementation of the inventive calibration method, the reference measurement and the calibration are not necessarily performed each time but rather only as a function of a specific parameter, on the basis of which it can be decided whether a calibration is necessary at the given point in time or not.

The cited parameter can be, but is not limited to, one of the following parameters:
the temperature of the surface measuring apparatus,
the ambient temperature,
the number of measurements performed by the surface measuring apparatus since its last calibration,
the length of time since the last calibration of the surface measuring apparatus,
the age of the surface measuring apparatus or individual components of the surface measuring apparatus, in particular a light source of the surface measuring apparatus.

All the cited parameters can be understood as a measure of the probability of the measuring accuracy of the surface measuring apparatus having deteriorated since the last calibration and a new calibration therefore being necessary.

The "temperature of the surface measuring apparatus" parameter is then of particular significance when a light-emitting diode is employed as the light source of the surface measuring apparatus since light-emitting diodes are subject to temperature-dependent spectral shift.

Evaluation of the parameter and the decision of whether a calibration is necessary is preferably made in a control unit within the docking station or the surface measuring apparatus.

Furthermore, by measuring a traceable standard (for example from the PTB; *National Metrology Institute of Germany*) with the surface measuring apparatus, the calibration data of the reference measuring surface can be compared to said traceable standard.

This can ensue at longer intervals, for example once annually, in order to ensure high calibration accuracy of the surface measuring apparatus using the reference measuring surface.

The data of the reference measuring surface is in this way traceable to a standard. The data of the reference measuring surface, particularly the spectral data in the case of a colorimeter, can then be stored in the surface measuring apparatus or in the docking station and be used during a subsequent calibration of the surface measuring apparatus.

Figure 2:
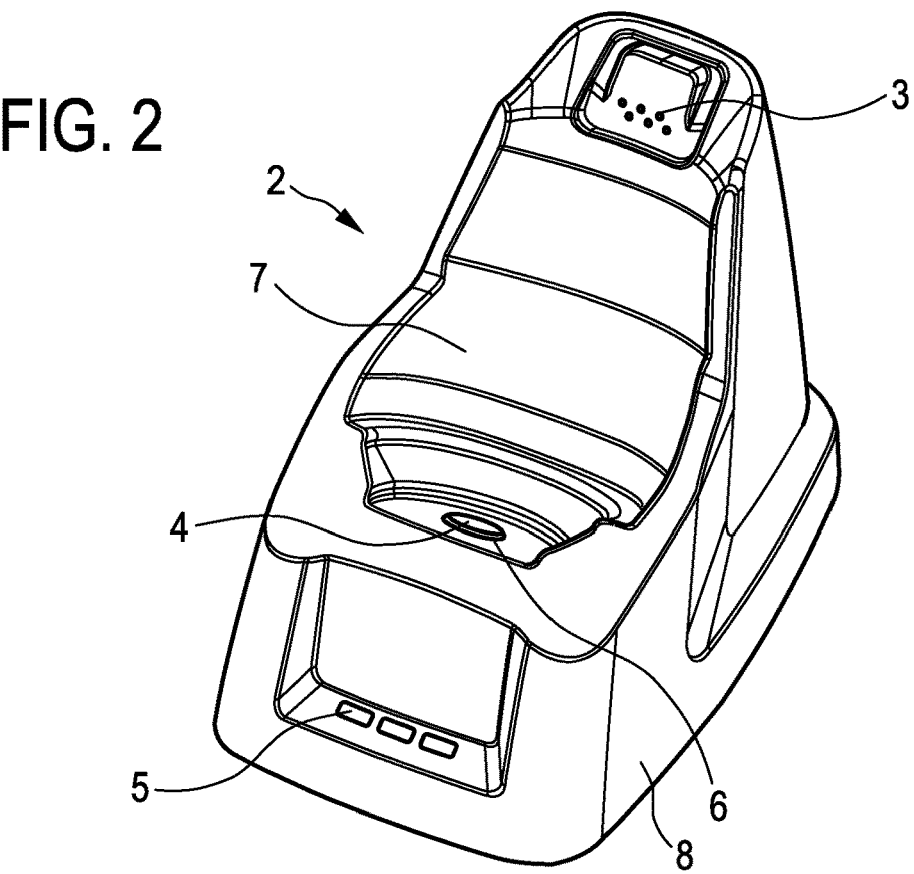
Figure 3:
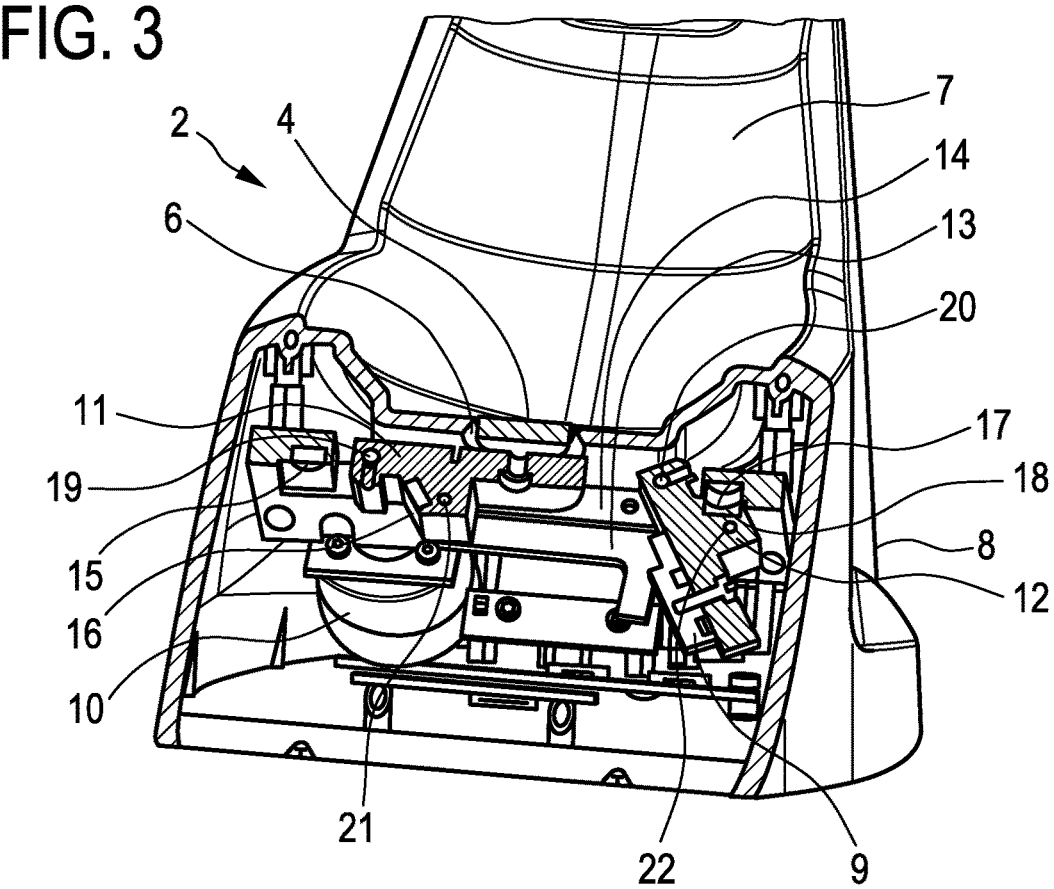
Figure 4:
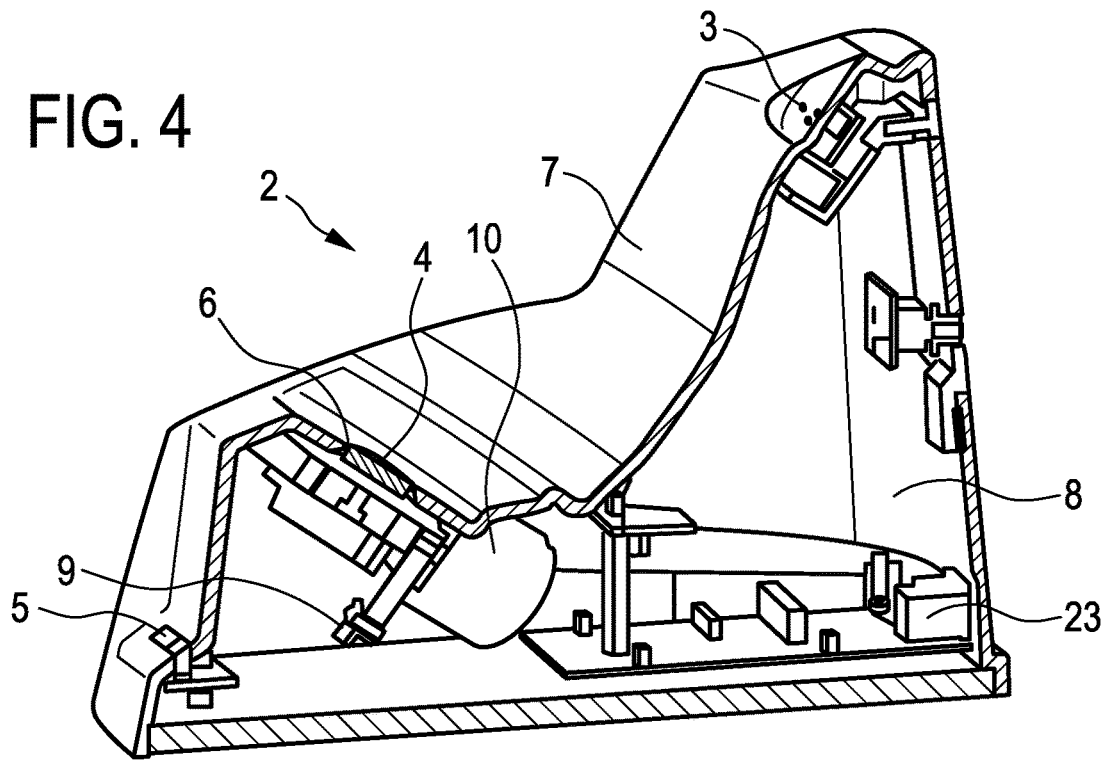

Further advantageous embodiments of the invention are contained in the accompanying figures in conjunction with the following description. Shown are:

FIG. 1 a side view of a docking station according to the invention with inserted surface measuring apparatus;

FIG. 2 a perspective view of the docking station at an angle from above;

FIG. 3 a frontal view of the docking station with cut-away housing;

FIG. 4 a side view of the docking station with cut-away housing.

FIG. 1 shows an inventive docking station 2 into which a surface measuring apparatus 1, for example a colorimeter, is inserted. The surface measuring apparatus 1 has a measuring opening (not visible) on its underside and a display (partly visible) for displaying the measurement data on its upper side.

As is seen from FIG. 2, the docking station 2 has a large, almost stepped recess 7 on its upper side, which is largely complementary to the likewise almost stepped underside of the surface measuring apparatus 1 (see FIG. 1). Electrical contacts 3 are arranged in the upper part of the recess 7, via which the battery of the surface measuring apparatus 1 can be charged. The contacts 3 are preferably designed as pins, in particular spring pins, whereby corresponding connectors or contact areas are arranged on the surface measuring apparatus 1 (or also vice versa). The contacts 3 are preferably also used for the data transmission, in particular for transmitting measurement data and/or control commands. Further preferably, the data transmission is in contrast wireless, in particular via WLAN, Bluetooth or other suitable protocol.

Alternatively, the battery of the surface measuring apparatus 1 can also be charged inductively, in which case a primary coil is arranged in the docking station 2 and a secondary coil arranged in the surface measuring apparatus 1.

Three indicator lights 5 are arranged at the front of the docking station 2 which are able to display the state of the docking station 2 and/or the surface measuring apparatus 1.

For controlling the docking station 2, a control button (not visible) is further arranged on its rear side.

In its lower region, the recess 7 exhibits a housing opening 6 in the housing 8 of the docking station 2. The housing opening 6 is arranged such that when the surface measuring apparatus 1 is inserted, its measuring opening lies substantially centered over the housing opening 6. A reference measuring surface 4 of a test standard or a closure 9 can alternatingly be pivoted into the housing opening 6 from the inside of the housing 8. Both the reference measuring surface 4 as well as the closure 9 are dimensioned such that they each almost completely fill the housing opening 6 upon being pivoted into the housing opening 6.

When the closure 9 but not the reference measuring surface 4 is pivoted into the housing opening 6, the reference measuring surface 4 is situated inside the housing 8, which is closed by the closure 9. The reference measuring surface 4 is thus covered from the environment of the docking station 2 and thereby protected from environmental influences which could impact the quality of the reference measuring surface 4, in particular light, dust, moisture, scratches or user fingerprints.

Inversely, when the reference measuring surface 4 but not the closure 9 is pivoted into the housing opening 6, reference measuring surface 4 lies directly in front of the measuring opening of the surface measuring apparatus 1 inserted in the docking station 2 and contacts the measuring opening so that the surface measuring apparatus 1 can perform a reference measurement.

The pivoting of the closure 9 out of the housing opening 6 and the pivoting in of the reference measuring surface 4 is preferably triggered by the surface measuring apparatus 1 being inserted into the recess 7 in that the establishing of an electrical contact between the contacts 3 or individual contacts and the surface measuring apparatus 1 is detected. Accordingly, the pivoting of the reference measuring surface 4 out of the housing opening 6 and the pivoting in of the closure 9 is preferably triggered by removing the surface measuring apparatus 1 from the recess 7 in that the interruption of the electrical contact between the contacts 3 or individual contacts and the surface measuring apparatus 1 is detected.

In the simplest case, the cited triggering occurs by the closing/opening of a circuit in which a corresponding electrical actuator is located, whereby the inward or outward pivoting motion is started or stopped respectively. Particularly preferentially, however, the detected electrical contact is used as a signal for digital microprocessor-controlled control electronics 23 integrated into the docking station 2, which then generates the corresponding control commands to the actuators for the inward or outward pivoting motion.

Preferably, other data, in particular error or status messages, can also be unidirectionally or bidirectionally transmitted via the contacts 3. In particular, a signal can be transmitted from the docking station 2 to the surface measuring apparatus 1 which indicates that the reference measuring surface 4 is pivoted into the housing opening 6 and a reference measurement can thus be made.

Equally as preferential, the inward and outward pivoting of the closure 9 or the reference measuring surface 4 respectively can be triggered by pressing the control button.

In FIGS. 3 and 4, the pivoting mechanism is depicted in the interior of the docking station 2. Both the reference measuring surface 4 as well as the closure 9 are in each case arranged at the end of a pivotable lever 11/12. The levers 11 and 12 are arranged such that in their respective level position, the reference measuring surface 4, or the closure 9 respectively, is arranged in the housing opening 6 and the surfaces of the reference measuring surface 4, respectively closure 9, lie substantially in one plane with the surface of the housing opening 6.

The levers 11 and 12 are pivotably mounted by pins 19/20 in the left and right outer region of a housing-mounted retainer 14, whereby the fulcrums are at the same height. Furthermore, the levers 11 and 12 are connected to a thrust rod 13 by pins 21 and 22 and pivotably mounted with respect thereto. The pins 21 and 22 in each case lie on a lateral projection of the body of the lever 11/12 extending at right angles albeit in different directions away from the longitudinal extension of the respective lever 11/12.

The pin 19 which supports lever 11 with reference measuring surface 4 in the retainer 14 is connected to the shaft of a motor 10 on the side of the retainer 14 opposite the lever 11. The motor 10 is preferably a stepper motor.

The thrust rod 13 couples the levers 11 and 12 such that a rotation of the motor causes a joint yet approximately 60° phase-shifted pivoting motion of levers 11 and 12 in the same direction.

The pivoting motion of lever 11 is thereby limited by the limit stop of a stop surface 16 affixed to the lateral projection of the lever 11 by pin 21 and an associated stop surface 15 on the retainer 14. In the stop position of lever 11, lever 12 assumes a horizontal position due to the phase shift of the pivoting motions of levers 11 and 12 so that the closure 9 is pivoted into housing opening 6 and closes it.

Correspondingly, the pivoting motion of lever 12 is limited by the limit stop of a stop surface 18 affixed to the lateral projection of the lever 12 by pin 22 and an associated stop surface 17 on the retainer 14. In the stop position of lever 12, lever 11 assumes a horizontal position so that the reference measuring surface 4 is pivoted into the housing opening 6. This position of levers 11 and 12 is depicted in FIG. 3.

The phase shift in the pivoting motion of levers 11 and 12 prevents them from colliding with each other when pivoting, which occurs in the same plane.

In this way, the inward and outward pivoting of the reference measuring surface 4 and closure 9 respectively is controlled by a simple mechanical coupling driven by the rotational movement of the motor 10.

The pairs of stop surfaces 15, 16 and 17, 18 are in particular designed as lateral surfaces of pairs of permanent magnets or respective pairs of a permanent magnet along with a soft iron plate so that when the levers 11 and 12 are in their respective stop position, they are additionally held in that position by magnetic forces. As a result, the entire pivoting mechanism is prevented from unintentional movement which could change the position of the reference measuring surface 4 in the housing opening 6 and thus distort the reference measurement.

A foam layer can preferably be arranged between the end of lever 11 and the reference measuring surface 4, whereby the reference measuring surface 4 is elastically supported relative the lever 11. In so doing, the reference measuring surface 4, when disposed in the housing opening 6, can be aligned as exactly parallel as possible to the housing 8 of the surface measuring apparatus 1 by the counterpressure of the housing of the surface measuring apparatus 1 when inserted in the docking station 2.

The control of the motor 10 and the indicator lights 5, the monitoring of the contacts 3 and the control button, as well as the control of the rest of the functions of the docking station 2 are effected by the control electronics 23 integrated into the docking station 2.

LIST OF REFERENCE NUMERALS 1 surface measuring apparatus
2 docking station
3 contact
4 reference measuring surface
5 indicator light
6 housing opening
7 recess
8 housing
9 closure
10 motor
11 lever for reference measuring surface
12 lever for closure
13 thrust rod
14 retainer
15-18 stop surfaces
19-22 pins
23 control electronics

What is claimed is:

1. A docking station for an in particular optical surface measuring apparatus, the docking station having at least one reference measuring surface which can be brought into at least one covered state in which it is covered from an environment of the docking station and at least one uncovered state in which it is not covered from the environment of the docking station so that the surface measuring apparatus, when it is accommodated in the docking station and when the at least one reference measuring surface is in the at least one uncovered state, can perform a reference measurement of the at least one reference measuring surface, wherein the at least one reference measuring surface is moveable relative to the docking station into at least one covered position in which it is covered from the environment of the docking station, particularly by a housing of the docking station, whereby the at least one reference measuring surface can be brought into a covered state, and that the at least one reference measuring surface is moveable relative to the docking station into at least one uncovered position which differs from the at least one covered position in which it is not covered from the environment of the docking station, whereby the at least one reference measuring surface can be brought into an uncovered state.

2. The docking station according to claim 1, wherein the docking station further comprises at least one closure which is movable relative to the docking station into at least one closed position, in which it closes an opening in the housing of the docking station, and at least one open position, in which it does not close said opening, wherein the closed position of the at least one closure corresponds to the uncovered position of the at least one reference measuring surface.

3. The docking station according to claim 2, wherein in each case, the movement of the at least one reference measuring surface and the movement of the at least one closure is a pivoting motion, and that the two pivoting movements are mechanically coupled, in particular by a lever mechanism.

4. The docking station according to claim 1, wherein the docking station has a plurality of reference measuring surfaces, in particular two, three, four, five, six or more.

5. The docking station according to claim 4, wherein the positions of the reference measuring surfaces relative to each other are not changeable.

6. The docking station according to claim 5, wherein the number of possible positions of each reference measuring surface is equal to the number of reference measuring surfaces, and that of said possible positions, exactly one position is an uncovered position and the remaining positions are covered positions.

7. The docking station according to claim 5, wherein the movement of the reference measuring surfaces between their possible positions is a rotational movement about a common axis, wherein in particular, all the reference measuring surfaces are arranged on a common revolving mechanism.

8. The docking station according to claim 1, wherein the docking station comprises means, in particular magnetic means or latching means, for at least temporarily fixing the at least one reference measuring surface in the at least one uncovered position.

9. The docking station according to claim 1, wherein the docking station further comprises at least one cover which is movable into a covered position in which it covers the at least one reference measuring surface from the environment of the docking station, whereby the at least one reference measuring surface can be brought into a covered state, and into an uncovered position in which it does not cover the at least one reference measuring surface from the environment of the docking station, whereby the at least one reference measuring surface can be brought into an uncovered state.

10. The docking station according to claim 9, wherein the movement of the at least one cover from the at least one covered position into the at least one uncovered position can be triggered by the surface measuring apparatus being introduced into the docking station or the movement of the at least one cover from the at least one uncovered position into the at least one covered position can be triggered by the surface measuring apparatus being removed from the docking station.

11. The docking station according to claim 10, wherein the cover is movable between the at least one uncovered position and the at least one covered position by a lever mechanism able to be actuated by the surface measuring apparatus.

12. The docking station according to claim 1, wherein the at least one reference measuring surface can be aligned into the at least one uncovered state for the performing of the reference measurement.

13. The docking station according to claim 12, wherein the alignment of the at least one reference measuring surface for performing the reference measurement can be initiated upon contact with the surface measuring apparatus.

14. The docking station according to claim 12, wherein the at least one reference measuring surface is supported on an elastic element, in particular an elastomer element or a foam element.

15. The docking station according to claim 1, wherein the docking station comprises means, in particular magnetic means or latching means, for at least temporarily fixing the surface measuring apparatus in the docking station.

16. A calibration method for a surface measuring apparatus having the steps:
    a) introducing the surface measuring apparatus into a docking station according to claim 1,
    b) bringing the at least one reference measuring surface into the at least one uncovered state,
    c) performing a reference measurement of the at least one reference measuring surface with the surface measuring apparatus and calibrating the surface measuring apparatus using the reference measurement,
    d) removing the surface measuring apparatus from the docking station, and
    e) bringing the at least one reference measuring surface into the at least one covered state, wherein step b) is performed before, during, or after step a) or step e) is performed before, during, or after step d), and wherein the steps are otherwise performed in the order indicated.

17. The calibration method according to claim 16, wherein step b) is triggered by step a) or step e) is triggered by step d).

18. The calibration method according to claim 16, wherein step b) is triggered independently of step a) or step e) is triggered independently of step d) by a user of the surface measuring apparatus.

19. The calibration method according to claim 16, wherein at least one of the following parameters is determined:
- temperature of the surface measuring apparatus,
- ambient temperature,
- number of measurements performed by the surface measuring apparatus since its last calibration,
- length of time since the last calibration of the surface measuring apparatus, or
- age of the surface measuring apparatus or individual components of the surface measuring apparatus, and wherein step c) is automatically triggered depending on the result of the determination.

* * * * *